United States Patent [19]

Stephany et al.

[11] Patent Number: 4,830,468
[45] Date of Patent: May 16, 1989

[54] LIQUID CRYSTAL PRINT BAR HAVING A SINGLE BACKPLANE ELECTRODE

[75] Inventors: Joseph F. Stephany, Williamson; Andras I. Lakatos, Penfield; Virgil J. Hull, Perinton; Alain E. Perregaux, Pittsford, all of N.Y.

[73] Assignee: Xerox Corporation, Stamford, Conn.

[21] Appl. No.: 213,751

[22] Filed: Jun. 30, 1988

Related U.S. Application Data

[63] Continuation-in-part of Ser. No. 4,932, Jan. 20, 1987, Pat. No. 4,783,146.

[51] Int. Cl.$^4$ ................................................ G02F 1/13
[52] U.S. Cl. ................................. 350/336; 350/331 R; 350/334; 346/160; 355/80; 355/133
[58] Field of Search ................... 350/331 R, 332, 333, 350/334, 336; 346/107 R, 108, 160; 355/18, 19, 80, 101, 124, 125, 133

[56] References Cited

U.S. PATENT DOCUMENTS

| | | | |
|---|---|---|---|
| 3,936,172 | 2/1976 | McVeigh | 355/3 R |
| 4,385,292 | 5/1983 | Nonomura et al. | 340/719 |
| 4,386,352 | 5/1983 | Nonomura et al. | 340/784 |
| 4,403,217 | 9/1983 | Becker et al. | 340/718 |
| 4,545,672 | 10/1972 | Ozawa | 355/3 R |
| 4,595,259 | 6/1986 | Perregaux | 350/331 R |
| 4,653,859 | 3/1987 | Masaki | 350/333 |
| 4,728,972 | 3/1988 | Stephany et al. | 346/160 |

OTHER PUBLICATIONS

SID '85 Digest, pp. 373-376, dated May 1985, title: "Print Head with Ferroelectric Liquid: Crystal Light-Shutter Array".

SID '86 Digest, pp. 263-265 by G-H Mode, title: "Development of High Speed and High-Resolution Liquid-Crystal Shutter (LCS) for Printers Based on Dual Frequency".

Technology dated May 1986-article title: "How Liquid Crystal Shutters are Used for Light Control in Non-Impact Printers".

*Primary Examiner*—Stanley D. Miller
*Assistant Examiner*—Richard Gallivan
*Attorney, Agent, or Firm*—Ronald F. Chapuran

[57] ABSTRACT

A linear array of liquid crystal shutters mounted near a photoreceptor surface and arranged transversely to the direction of travel of the photoreceptor surface, an array of multiplexed thin film transistors (TFT's) connected to the array of liquid crystal shutters for electrically driving the shutters and logic means connected to the multiplexed array of thin film resistors selectively pulsing the liquid crystal shutters to selectively expose the photoreceptor surface a line at a time. The system further includes a single backplane and circuit means for producing an electric field between the backplane and electrodes of each of the liquid crystal shutters to prevent passage of light through the shutters and means for selectively de-energizing each of the pairs of electrodes for predetermined time period in response to the receipt of input data signals.

13 Claims, 7 Drawing Sheets

LIQUID CRYSTAL PRINT BAR HAVING A SINGLE BACKPLANE ELECTRODE

BACKGROUND OF THE INVENTION

This application is a continuation-in-part of copending U.S. Ser. No. 004,932, filed Jan. 20, 1987, now U.S. Pat. No. 4,783,146.

FIELD OF INVENTION

The present invention relates to liquid crystal pads used in printers, and in particular to a transient state type liquid crystal image bar driven by a multiplexed array of thin film transistors.

DESCRIPTION OF THE PRIOR ART

Print bars are rapidly becoming a necessary component in printers and multifunction electronic reprographic systems. The optical print bar offers the convenience of making the office copier serve as a computer printout device while still retaining its use as a copier. It is also possible to use the copier in facsimile transmissions. The use of liquid crystals in various configurations is well known. For example, U.S. Pat. No. 4,385,292 discloses a segmented liquid crystal display and a system for driving the display comprising thin film transistors coupled to a plurality of segmented display electrodes. U.S. Pat. No. 4,386,352 discloses a matrix liquid crystal display comprising a thin film transistor array and U.S. Pat. No. 4,403,217 discloses a multiplex liquid crystal display, the display comprising a thin film dielectric layer. U.S. Pat. No. 3,936,172 teaches the use of a liquid crystal material at the platen station in a reproduction machine to mask predetermined regions of an original document.

It is also known to provide a printhead with a ferroelectric liquid crystal light shutter array. The head is constructed from a florescent lamp, a light shutter array using liquid crystals and a focusing lens as disclosed in SID'85 Digest, pages 373–376, dated May 1985. In addition, SID '86 Digest, pages 263–265 discloses a liquid crystal shutter for a printer based on a dual frequency addressed guest-host mode and the publication, Technology, dated May 1986, generally discloses the use of liquid crystal shutters for light control and non-impact printers. It is also known as disclosed in U.S. Pat. No. 4,728,972, assigned to the same assignee as the present invention, to provide multiplexing in a liquid crystal print system to reduce the number of drivers and to place a section of the print system in an unaccessed state while another section begins printing in order to prevent blurring and smearing.

U.S. Pat. No. 4,653,859 discloses a liquid crystal optical modulating element with a multiplexing scheme to reduce drivers and U.S. Pat. No. 4,545,672 discloses a liquid crystal shutter control scheme for controlling the transmission of the copying light beam for reducing the capacity of the light source. However, the U.S. Pat. No. 4,653,859 discloses multiplexing of the pixels rather than multiplexing TFT's as in the instant invention and in addition, the U.S. Pat. No. 4,653,859 references does not show pixels driven by TFT's. In the U.S. Pat. No. 4,545,672 reference, the pixels are staggered to accommodate the heavy packing of the drivers in this chips, whereas in the instant invention, staggering is done to get more light through since the pixels can be made larger. Also, in the U.S. Pat. No. 4,545,672 reference, it is required that the chips be mounted and wire bonded to the pixel electrodes whereas in the instant invention, the TFT's are evaporated together with their connections over the entire length of the print bar. There is no wire bonding or gluing down of the chips that address the shutters directly. Also, in the U.S. Pat. No. 4,545,672 reference the drive chip is a silicon chip not TFT's as in the instant invention.

A difficulty with the prior art print bars is generally the complexity and cost of the print bar as well as the difficulty in obtaining high resolution and speed when used as a printer. Another difficulty with prior art print bars is that the liquid crystal light shutters are either addressed directly by one electronic driver per liquid crystal light shutter or they are multiplexed optically in such a way that the liquid crystal light shutters are organized into two or more rows and one electronic driver is shared between one liquid crystal light shutter in each of the rows of liquid crystal light shutters. This scheme may lead to the reduction of the number of electronic drivers by a factor of two or more, but it also reduces the exposure time by a factor of two or more provided by each liquid crystal light shutter during a single line addressing time.

It is an object of the present invention, therefore, to provide a new and improved print bar using liquid crystal shutters. Another object of the present invention is to provide a liquid crystal array print bar incorporating thin film transistor drivers, which are used as switches, for high multiplexability, speed and reduced cost. It is still another object of the present invention to drive each liquid crystal picture element with a separate thin film transistor and then multiplex the input signals to the thin film transistors. It is still another object of the present invention to use the transient electro-optic effect within the liquid crystal shutters to increase the printing speed at which the liquid crystal print bar can operate. It is still another object of the present invention to simplify the system and reduce cost by the use of two-voltage-level drivers to avoid the complication of using three or more voltage level drivers. Another object of the present invention is to multiplex the liquid crystal light shutters electronically by providing one TFT for each liquid crystal light shutter. The TFT is operated as an electronic switch and the TFT's are electronically multiplexed to one or more driver chips. This design provides exposure times through each of the liquid crystal light shutters independent of the level of multiplexing. In addition, it reduces the number of I.C. chips needed by the level of the multiplexing. Another object of the present invention is to provide an evaporated TFT array widely distributed on a substrate wherein one TFT addresses one pixel. Another object of the present invention is to provide an array of TFT's to improve performance of a liquid crystal print bar by increasing contrast and throughput of light. Further objects and advantages of the present invention will become apparent as the following description proceeds and the features characterizing the invention will be pointed out with particularity in the claims next to a forming a part of this specification.

SUMMARY OF THE INVENTION

The present invention is a linear array of liquid crystal cells or shutters mounted adjacent to a photoreceptor surface and arranged transversely to the direction of travel of the photoreceptor surface, an array of multiplexed thin film transistors (TFT's) connected to the array of liquid crystal shutters for electrically driving the shutters, and logic means connected to the multiplexed array of thin film transistors selectively pulsing the liquid crystal shutters to selectively expose the photoreceptor surface a line at a time. The system further includes a single backplane and circuit means for producing an electric field between the backplane and electrodes of each of the liquid crystal shutters to prevent passage of light through the shutters and means for selectively de-energizing each of the pairs of electrodes for predetermined time period in response to the receipt of input data signals.

BRIEF DESCRIPTION OF THE DRAWINGS

For a better understanding of the present invention, reference may be had to the accompanying drawings wherein the same reference numerals have been applied to like parts and wherein.

DESCRIPTION OF THE INVENTION

Figure 1:
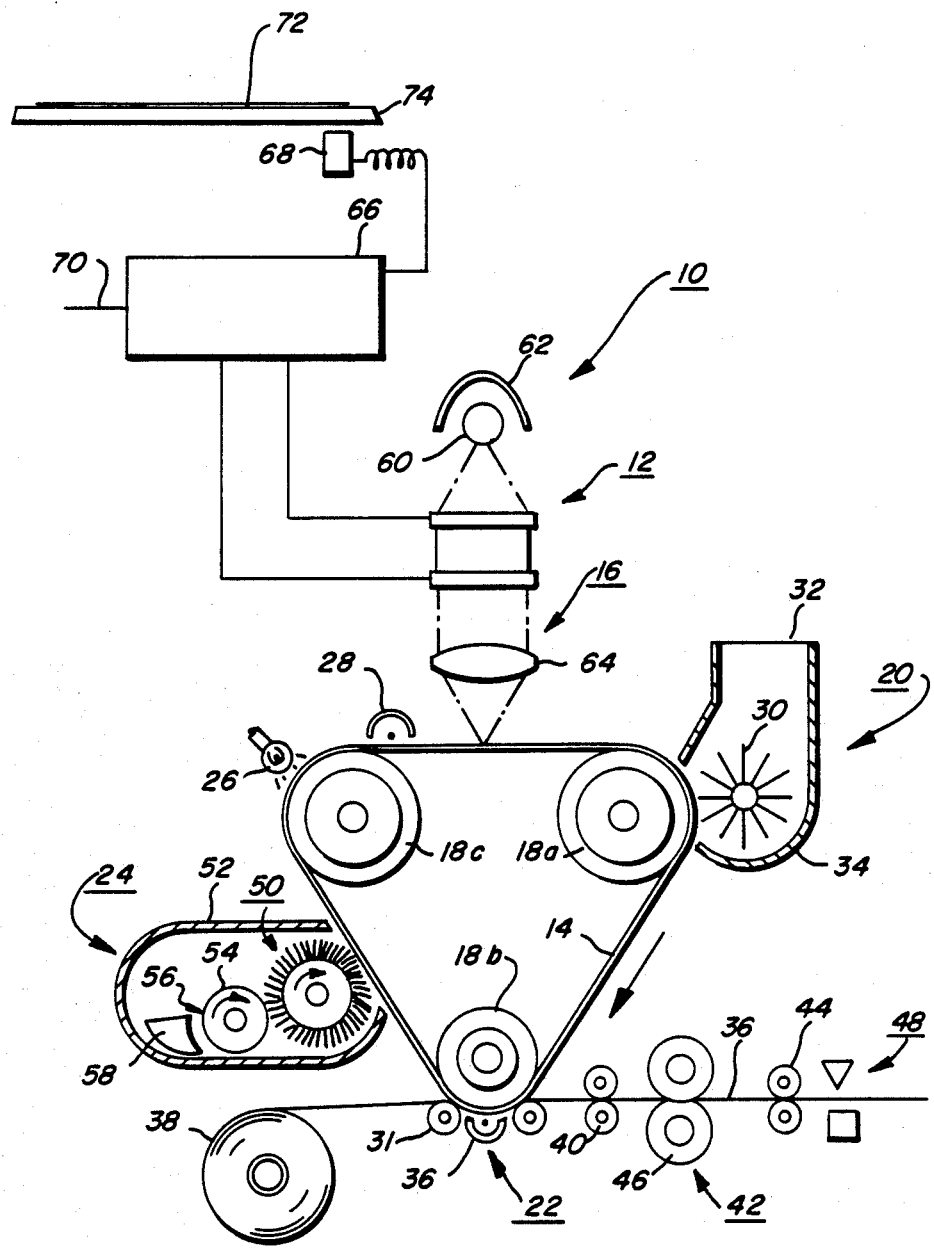
FIG. 1 illustrates the overall printer configuration.

Referring to the system diagram of FIG. 1, there is shown an electrophotographic printer 10 utilizing a liquid crystal print bar 12. The printer 10 includes a series of process stations through which a photoconductive member 14 in the form of a endless belt passes.

Beginning with the imaging station 16, whereat the latent electrostatic image is formed, the photoconductive member 14 proceeds in the direction of the arrow around the guide rollers 18a, 18b and 18c, past development station 20, transfer station 22, cleaning station 24, erase lamp 26 and precharging corona generating device 28 prior to returning to the imaging station. At development station 20, a rotating magnet brush or paddle wheel 30, housed in hopper 32, presents toner particles 34 onto the surface of the photoconductive member 14 as it moves around guide roller 18a. The toner particles 34 are charged with a polarity opposite the charges placed on the photoconductive member by the corona generating device 28 by means well known in the art by either triboelectric charging technique or by a corona generating device (not shown) or both. The toner particles are attracted and held by the latent electrostatic image recorded on the photoconductive member at the imaging station, thus developing and rendering the latent image visible. The developed image is transferred to a permanent material 36, such as paper, at the transfer station 22. After the developed image is transferred, the photoconductive member proceeds past the cleaning station 24 where all residual toner particles are removed.

Paper is provided by supply roll 38 which is pulled through the transfer station via drive rolls 40 and through a toner particle fusing station 42 by drive rolls 44, where the developed image on the paper is permanently fixed thereto by means well known in the prior art, such as, by fusing rolls 46 which apply heat and pressure to the developed image. Cutter assembly 48 cuts the paper 36 with the fixed images into separate sheets as the paper moves into a collection tray or sorter (not shown). Subsequent to the developed image transfer, the photoconductive member 14 is moved past the cleaning station 24, which removes any residual toner particles not transferred to the paper. A soft rotating brush 50, housed in chamber 52, removes the residual toner from the photoconductive member 14 and a single conductive, electrically biased roll 54 is used to remove the toner particles from the brush 50. A conventional flicker bar (not shown) is arranged to assist in toner particles removal from the soft brush and a doctor blade 56 is used on the biased roll 54 to scrape the toner particles therefrom into a collecting tray 58, so that the toner particles collected may be reused if that is desired.

The imaging station comprises a light source 60 and reflector 62 which illuminates a liquid crystal print bar 12. It should also be noted that a small light source with a fiber optic array type optical coupler could be used. Light selectively passed through the print bar is focused by lens means 64 which may be one or more single lens, a Selfoc (Nippon Glass trademark) lens system or a plurality of miniature lens associated with fiber optics. The print bar 12 selectively passes light to form latent electrostatic images one line at a time by erasing or discharging the image background areas. The print bar is formed by a single row of dot shutters actuated by selective application of a voltage to the plurality of electrodes on one of the substrates of the image bar. It should be noted that there also may be multiple rows of staggered dot shutters. An electronic controller or microcomputer 66 energizes the appropriate electrodes in response to digitized data from a scanning means such as a charged coupled device (CCD) linear image sensors 68 or digitized data from a source outside the printer 10, for example, from a character generator, computer or other means for storing and retrieving data via conductor 70. If a scanning CCD or a linear image sensor is used, it scans one line of information at a time from a stationary document 72 placed on a transparent, fixed platen 74. The CCD or image sensor scanning speed is substantially the same as the speed of the photoconductive member if real time imaging is to occur. Otherwise, a means for storing the document digitized data would have to be included in the electronic controller.

Figure 2:
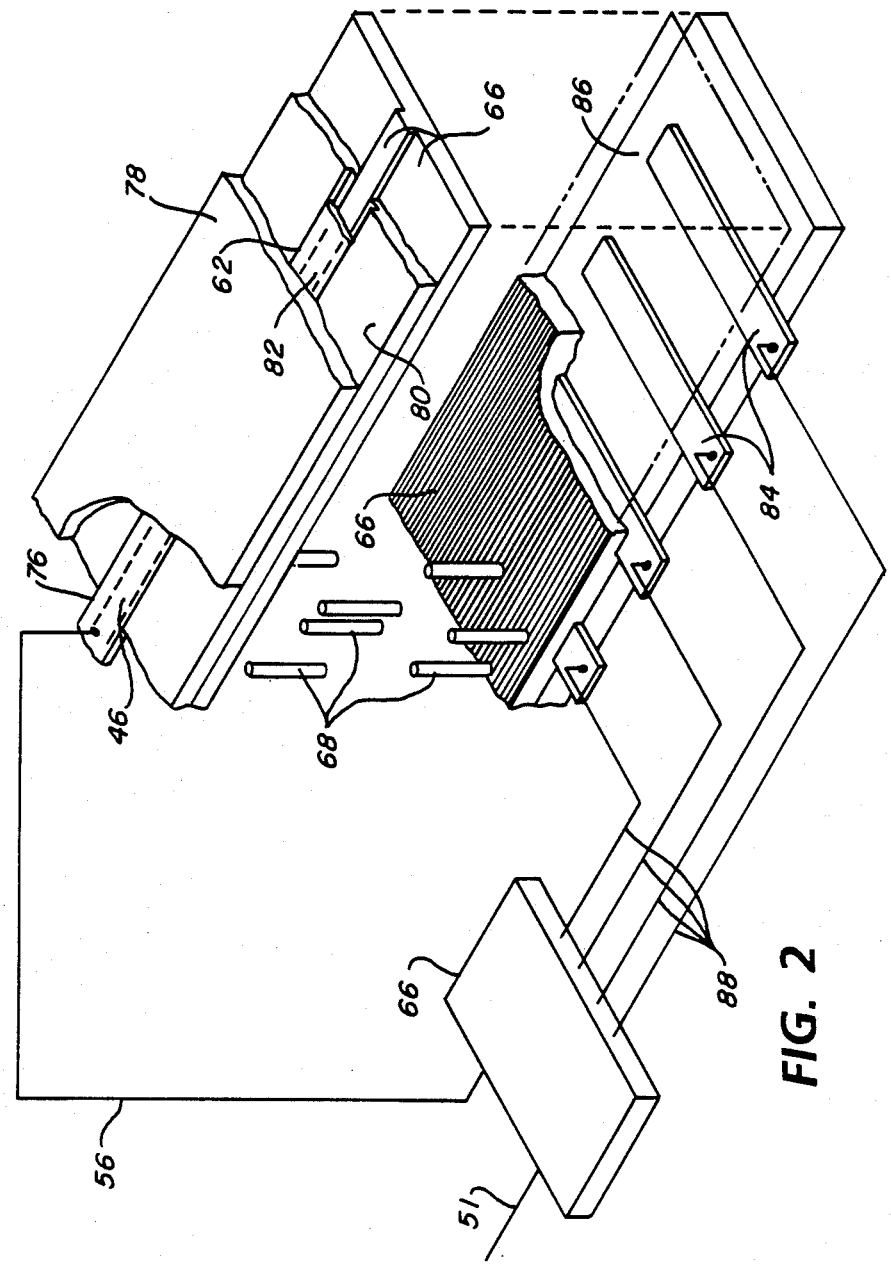
FIG. 2 illustrates the detail of a typical prior art print bar.

FIG. 2 shows schematically a single electrode configuration of an print bar typical of the type of print bar used in the prior art. A plurality of transparent electrodes 76 could run the length of the inner surface of the upper glass substrate 78 although only one is illustrated. Light shield 80 covers the inner surface of glass substrate 78 and overlaps the edges of electrodes 76 so that a slit 82 is centrally formed along the length of the electrode 76. A plurality of transparent, parallel electrodes 84 are formed on the inner surface of the lower glass substrate 86. The plurality of electrodes 84 are equally spaced from each other and are perpendicular to the electrode 76. The density of the plurality of electrodes is about 12 per millimeter, up to as high as 40 per millimeter if desired, thus forming one single array of dot shutters to be used as an image bar to produce latent electrostatic images on a photoconductive member. The electronic controller 66 is connected to the electrodes 84, 76 via leads 88 and 56; electrode 76 is connected to a voltage selected by the controller 66. The plurality of electrodes 84 are generally connected to suitable drivers providing a 50 volt RMS square wave at a frequency of 5 to 15 KHz until light from source 60 is to be transmitted, whereupon the applied voltage to the desired electrode 84 is interrupted to transmit light to the photoconductor 14 or not interrupted when no light is to be transmitted. For further details of the liquid crystal image bar, reference is made to U.S. Pat. No. 4,595,259 incorporated herein.

Figure 4:
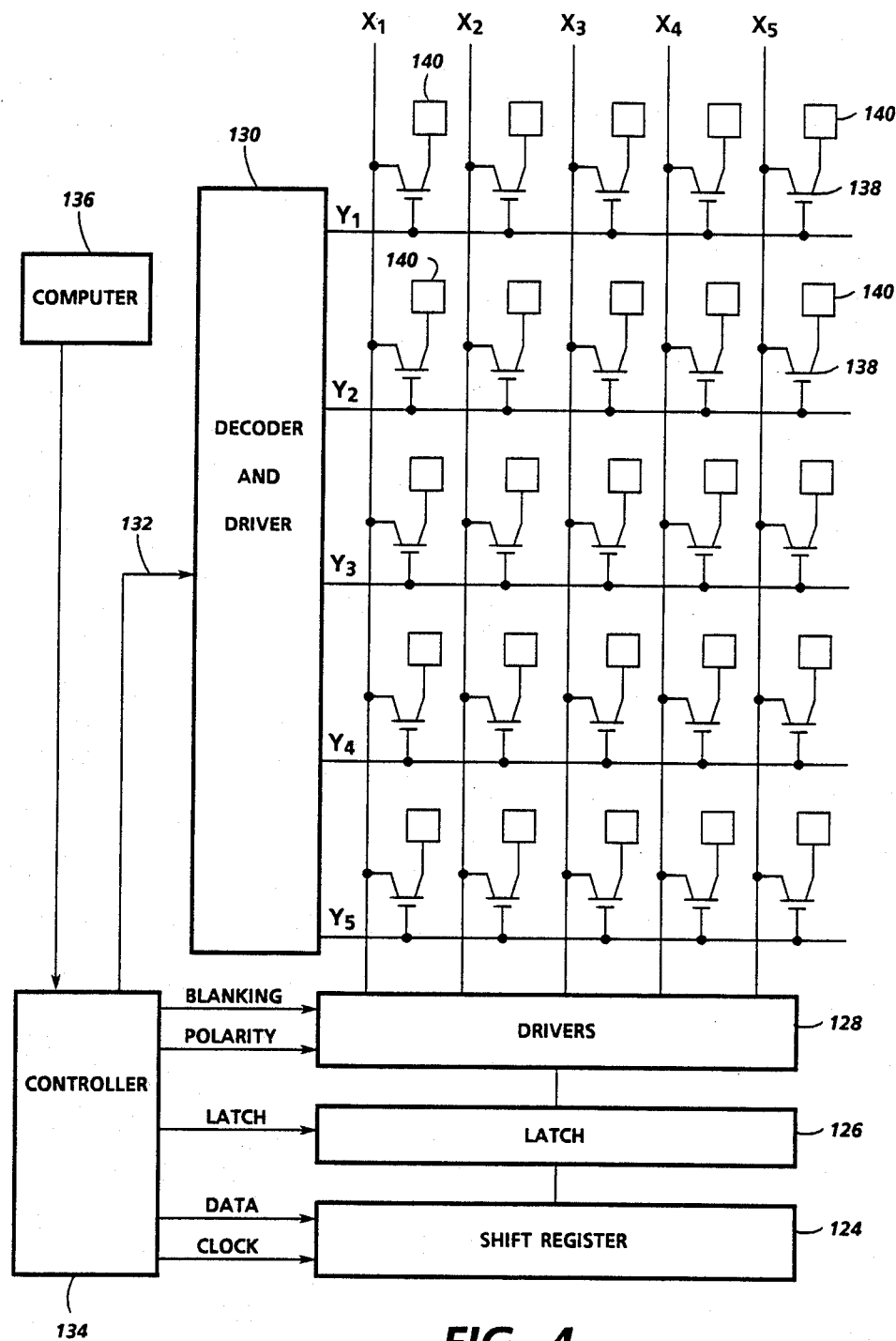
FIG. 4 is a block diagram of the control of a print bar liquid crystal and TFT array in accordance with the present invention.

In general, in accordance with the present invention, the X axis inputs in FIG. 4 provide a "set-up" voltage to the TFT's for the purpose of using the transient effect in the liquid crystal when the TFT's are gated. The use of the transient effect is for the purpose of speeding the repose of the liquid crystal. The use of a blocking layer, a layer of high resistivity material over the driver pads or backplane to inhibit the flow of direct current and thereby prevent deterioration of the liquid crystal, enables the use of two voltage level drivers instead of three. However, three-level operation of the drivers can be implemented if necessary. Another embodiment makes use of a mode of operation of the Thin Film Transistor (TFT) that depends upon achieving reduced leakage in the TFT. The main advantage of this embodiment is the reduction of the applied voltages to gate the TFT's as well as the possibility of applying an alternating voltage of high frequency, 5 to 15 KHz, to the liquid crystal without needing three level drivers.

Figure 3:
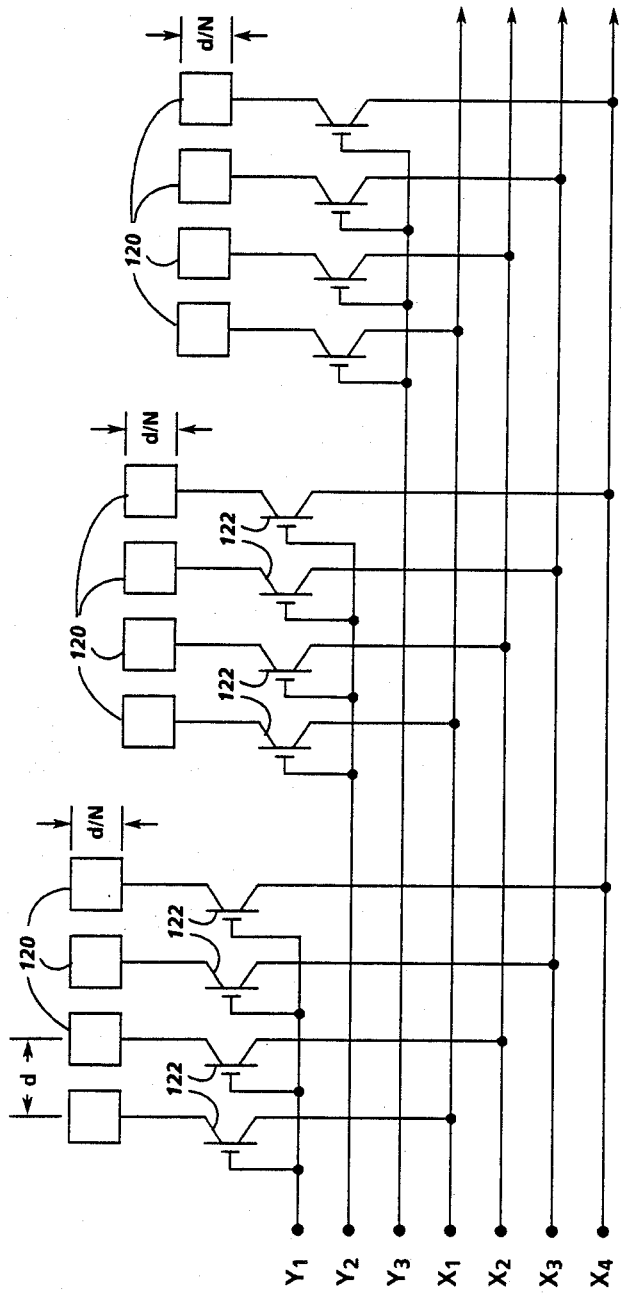
FIG. 3 illustrates the arrangement of the thin film transistors (TFT's) and liquid crystal cells in accordance with the present invention.

With reference to FIG. 3, the arrangement of the TFT's and liquid crystal pixels used is illustrated. A plurality of liquid crystal elements represented by pixel pads 120 are driven by a plurality of TFT's 122. Each pixel pad 120 is driven by one TFT 122. Assuming that a multiplex ratio of N is used, the TFT's are blocked off in N groups, in the example in FIG. 3, three groups of four TFT's each. Within each group, all the gates of the four TFT's are made common, illustrated at ($Y_1$, $Y_2$, $Y_3$), while the sources run to a number of busses equal to the number in each group illustrated at $X_1$, $X_2$, $X_3$ and $X_4$. Three such groups of four pixels each have been shown, but in the invention a much larger multiplex ratio would be used, typically 20 to 64. It is not necessary to make the number of groups equal to the number of pixels in each group, although by doing this the greatest reduction in the total number of X and Y busses would occur. In actual practice it is desirable to make the number of Y busses less than the number of X busses to reduce the turn-on times and current peaks as well as the need to provide extremely short driving voltages to the X and Y busses.

Also in FIG. 3, each group of pixels have been displaced a distance of d/N below the group preceding it, where d is the distance between pixels as shown. This is done to bring the variously printed pixel groups into alignment after the completion of the printing of one line in actual practice it is not necessary to make this displacement. Due to the high value of N that will be used, it is only necessary to tilt the entire line by one pixel (d) relative to the photoreceptor surface. The effect of the lack of the individual displacements within each group would hardly be noticed in the practical case.

FIG. 4 shows a block diagram of the system control. The line of pixels have been arranged in a square matrix for diagrammatical purposes only. Physically, the pixels are in single row. The vertical or X busses $X_1$-$X_5$ are addressed with a combination of a shift register 124, latch 126 and drivers 128. The drivers 128 may be either two or three level drivers, the two—level drivers being required if a blocking layer is present in the liquid crystal cell, while the three-level drivers being required without a blocking layer. The horizontal or Y busses $Y_1$-$Y_5$ are addressed with a decoder and driver 130 in place of the usual shift register and latch. Since the addressing of the Y axis may be in a non-sequential manner, a shift register on the Y axis cannot be used.

The decoder and driver are addressed by a suitable signal 132 from controller 134 which also provides both blanking and polarity signals to the drivers 128, a latch signal to latch 126 and data and clock signals to shift register 124. The controller 134 receives the data input from any suitable source such as computer 136. The data consists of rows of bitmapped information to be printed.

Figure 5:
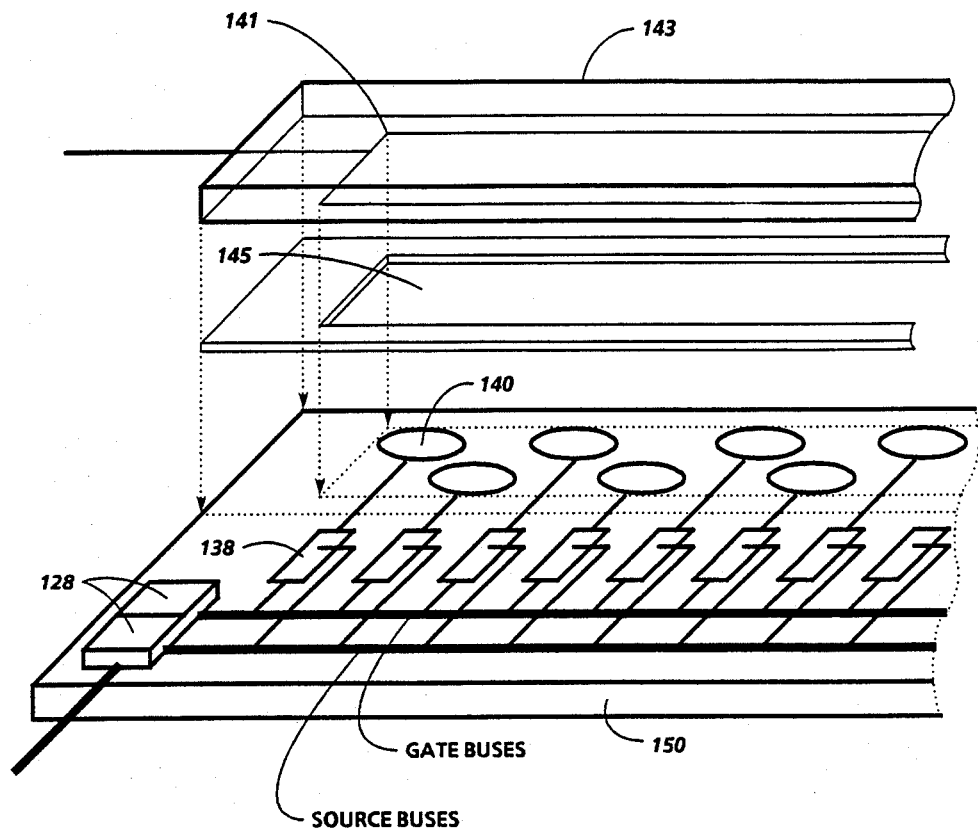
FIG. 5 illustrates the geometric arrangement of a single backplane and TFT liquid crystals in accordance with the present invention.

With reference to FIG. 5, at the intersection of each X and Y bus a TFT 138 exists, driven by driver chips 128 via gate buses and source buses mounted on pixel substrate 150 and connected to a pixel pad 140 on pixel substrate 150 in contact with a liquid crystal 145. A single backplane 141 on backplane substrate 143 covers the entire square matrix and is grounded. No constant voltage is allowed on the backplane 141, since this voltage would allow a current to leak through the liquid crystal whether or not the TFT 138 is on or off, and turn on all pixels. The reason for this leakthrough is the small leakage current that each TFT presently has, not the leakage of the liquid crystal.

It should be noted that the TFT's 138 and related connections are evaporated over the entire length of the print bar with one TFT addressing one pixel 140. There is no wire bonding or gluing down of the drivers 138 that directly address the pixels 140. The pixels 140 are staggered and the TFT's are spread over the entire print bar in order to get more light through the pixels since the pixels can be made larger. A TFT is placed on each pixel with no multiplexing of the pixel, but rather multiplexing the input to the TFT. This provides the ease of multiplexing the TFT's while the liquid crystal 145 essentially behaves as if it were not multiplexed. This provides significant performance and advantage over conventional schemes which multiplex the liquid crystal material itself. In the instant invention, the TFT's improve the performance of the print bar by increasing contrast and throughput of the light as well as eliminating the need for a large number of highly expensive chips.

In operation, for the transient effect, it is first necessary to "setup" the alignment of a entire line of the liquid crystal array by applying a voltage to all elements of the line. In FIG. 4, assume that line Y3 is being set up. Line Y3 is strobed by applying a voltage on the Y3 line and simultaneously turning on all the X drivers by means of a blanking input. The duration of this voltage is less than the duration of the TFT "on" time and is typically not greater than $\frac{1}{2}(T_O/N)$ where $T_O$ is the time necessary to display one raster line.

In the next step, on/off data, previously loaded into the X axis shift register 124, is latched to the drivers 128 and the blanking bus turned off. The data to be printed in line Y1, for example, is now available on the X axis.

Simultaneously to this, line Y1 is turned on by the decoder of driver 130. Line Y1 has had a set up voltage previously applied in the same manner as line Y3, but some time earlier. The data to line Y1 is held for a duration of $\frac{1}{2}(T_O/N)$ or longer, thus optically allowing light to reach the photoreceptor surface for a duration of less than $T_O$.

Figure 6:
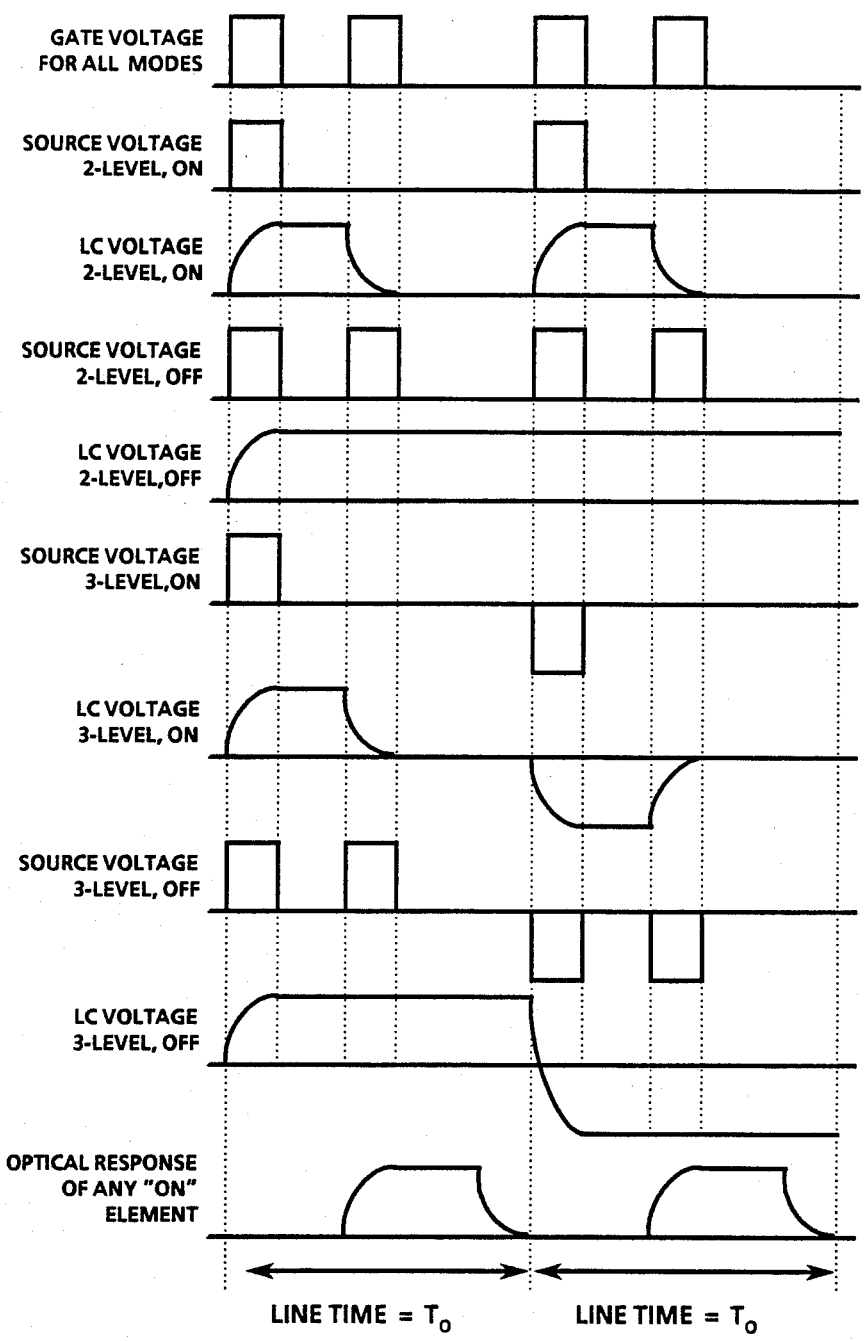
FIG. 6 illustrates the timing signals for the "On" and "Off" condition of the print bar for the two cases in which 2-level and 3-level drivers are used.

FIG. 6 illustrates the wave shapes for the optically "on" and "off" condition in the case that 2-level or 3-level drivers are used. In Figure 6 on Line A, a gate voltage is applied to the TFT's. This would be any of the lines marked "Y" in FIG. 3. This gate voltage turns the TFT "on", thereby reducing its internal impedance and allowing the voltage applied to the source of the TFT to be transferred to its drain. In the case that two level drivers are used, and the element being driven is to be optically "on", a voltage is applied to the source of the TFT, which goes to the inputs labeled "X" in FIG. 3 and is shown in FIG. 6 as Line "B". The resulting voltage across the liquid crystal is shown in FIG. 6 Line "C". In this line the setup voltage is shown for two consecutive line times, resulting in two pixels being printed. The resulting optical output from this pixel is shown as Line "1" in FIG. 6. In the case that two level drivers are being used and the element to be printed is "off", the voltages applied to the gate of the TFT is the same as FIG. 6 Line "A", but the voltage applied to the source is as in FIG. 6 Line "D". Here, voltage is applied to the liquid crystal at all times that the TFT is "on" thus maintaining a continuous voltage on the liquid crystal and preventing the transmission of light. The voltage on the liquid crystal is shown in FIG. 6 Line E and the resultant light transmitted is always zero and is therefore not illustrated. In the case that 3-voltage level drivers are used, the configuration is the configuration is the same as FIG. 3, but the voltage applied to the source of the TFT is negative every other frame. This is illustrated in FIG. 6 also. Here, the gate voltage applied in the 3-level case is shown in line A. But the source voltage applied is shown in FIG. 6 Line "F" for the case of an "on" pixel. The resulting voltage on the liquid crystal alternated on two alternating lines is shown on Line "G". The purpose of this alteration is to reduce the average direct current flow of the applied voltage to as near to zero as possible over a period of several line times. The optical output of the pixel is shown in Line "1" of FIG. 6. In the case that three level drivers are used and the element to be driven is "off", the gate voltage is still that of Line "A", but the source voltage is as shown in Line "H". The resultant voltage in the liquid crystal is shown in Line "1", and the resultant line transmitted by the pixel is zero and is therefore not shown. We assume that in the case of 2-level drivers a blocking layer is used while in the case of 3-level drivers it is not necessary to use a blocking layer. However, it should be noted that an image bar can be used with either the charged or discharged areas being developed.

Figure 7A:
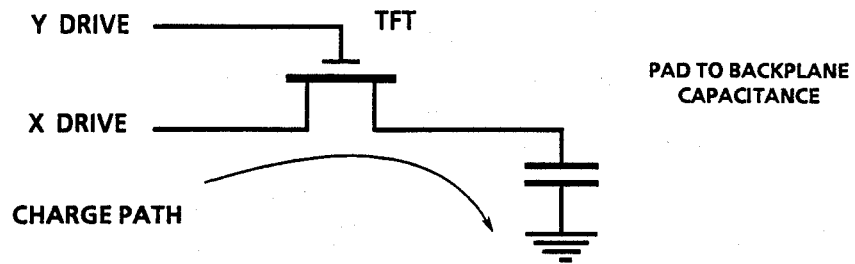
FIGS. 7a and 7b illustrate another mode of operation in accordance with the present invention.
Figure 7B:
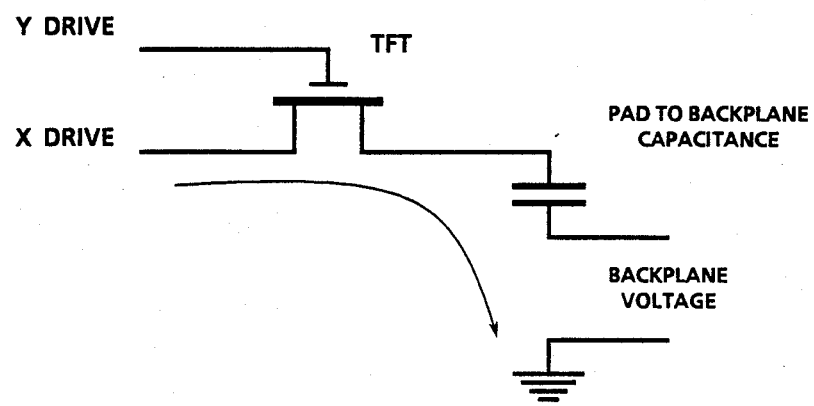

In the previous embodiment, the TFT has been operating in the pass transistor mode. As a consequence of this, all the voltage and power necessary to charge or discharge a pixel must come from the X axis drivers. This mode is schematically shown in FIG. 7A Another mode is possible. If, in the configuration of the embodiment of FIGS. 4 and 5, voltage on the single backplane 141 is applied and assuming that the TFT's, when off, do not have sufficient leakage to charge the pixel pad, the X and Y drivers may be reduced in voltage to the point that the TFT is merely turned on and off, without the X axis supplying the charging current and voltage which is shown in FIGS. 7a and 7b. It should be pointed out that the configuration is identical to the embodiment on FIG. 3, and only the applied voltages are different.

The operation of the TFT in this amplifier mode has the advantage that the X and Y voltages are greatly reduced. Further, it is possible to apply an alternating voltage to the backplane, which is the source of charging current, so that the voltage gated to the liquid crystal is alternating instead of being a DC pulse, thereby eliminating the need for blocking layer operation. It is possible to make use of this amplifier mode in the embodiment of FIG. 4 only if the distribution of the setup pulse would occur across the liquid crystal but not across the TFT's.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

We claim:

1. Apparatus for projecting data on a photoreceptor surface including:
   drive means for moving the photoreceptor surface,
   a linear, optical writing station arranged transversely to the direction of travel of the photoreceptor surface including an array of liquid crystal pads mounted adjacent to the photoreceptor surface, said liquid crystal pads being arranged along two parallel lines with the location of the liquid crystal pads of the second line being staggered relative to the location of the liquid crystal pads of the first line, said array extending over a linear extent equivalent to the width of said photoreceptor surface onto which data is to be projected,
   an array of thin film transistors supported on a substrate and connected to the array of liquid crystal pads for electrically driving said pads,
   a source of light for projecting light onto said liquid crystal pads,
   means to focus said light onto the photoreceptor surface from the liquid crystal pads,
   a first means electrically connected to the liquid crystal pads for initially energizing the pads to prevent the passage of light therethrough,
   a second means electrically connected to the pads for selectively de-energizing said first means to permit the passage of light through selected liquid crystal pads, and
   multiplexing means electrically connected to the array of thin film transistors for selective pulsing of said array of liquid crystal pads whereby said photoreceptor surface is selectively exposed by light from said light source wherein the improvement comprises:
   a single backplane electrode disposed near the liquid crystal pads.

2. The apparatus of claim 1 wherein said thin film transistors are amorphous or polycrystalline silicon.

3. The apparatus of claim 1 wherein the array of thin film transistors are evaporated on the substrate and the pads are staggered on said substrate.

4. The apparatus of claim 1 including a layer of blocking material placed over the pads driven by the TFT drivers.

5. The apparatus of claim 1 including a layer of blocking material placed over the backplane.

6. An improved control for a liquid crystal print bar for use in a printer of the type having a moving photoconductive member, comprising:
- first and second substrates disposed near the photoconductive member,
- a first plurality of transparent electrodes located on the first substrate and a single transparent backplane located on the second substrate,
- an illuminating means for directing light towards the photoconductive member,
- multiplexing means, and
- an array of thin film transistors evaporated on the first substrate and connected between the multiplexing means and the electrodes to selectively pulse said electrodes to form an image on the photoconductive member.

7. The apparatus of claim 6 including a layer of blocking material placed over said transparent electrodes.

8. The apparatus of claim 6 including a layer of blocking material placed over the backplane.

9. The control of claim 6 including circuit means for energizing the electrodes on the first substrate in order to prevent the passage of light through the print bar, and means for selectively de-energizing each of the plurality of electrodes on the first substrate for a predetermined time period.

10. Apparatus for projecting data on a photoreceptor surface comprising:
- drive means for moving the photoreceptor surface,
- an optical writing station arranged transversely to the direction of travel of the photoreceptor surface including an array of liquid crystal pads mounted adjacent to the photoreceptor surface,
- an array of thin film transistors connected to the array of liquid crystal pads for electrically driving said pads,
- a layer of high resistivity material being coated on said pads,
- a source of light for projecting light onto said liquid crystal pads,
- means to focus said light onto the photoreceptor surface from the liquid crystal device, and
- multiplexing means electrically connected to the array of thin film transistors for selective pulsing said array of liquid crystal pads whereby said photoreceptor surface is selectively exposed by light from said light source.

11. The apparatus of claim 10 wherein the array of thin film transistors are disposed on a substrate, the transistor being evaporated onto the substrate, the liquid crystal pads being staggered on said substrate.

12. The apparatus of claim 10 wherein the array of thin film transistor and the array of liquid crystal pads are connected one on one.

13. The apparatus of claim 10 wherein the liquid crystal pads are initially energized and including means to selectively de-energize a liquid crystal pad of said array of liquid crystal pads for a predetermined period of time to expose said photoreceptor surface.

* * * * *